Feb. 3, 1959 C. G. BATHÉ 2,871,620
PALM TREE TRIMMER
Filed Dec. 29, 1955
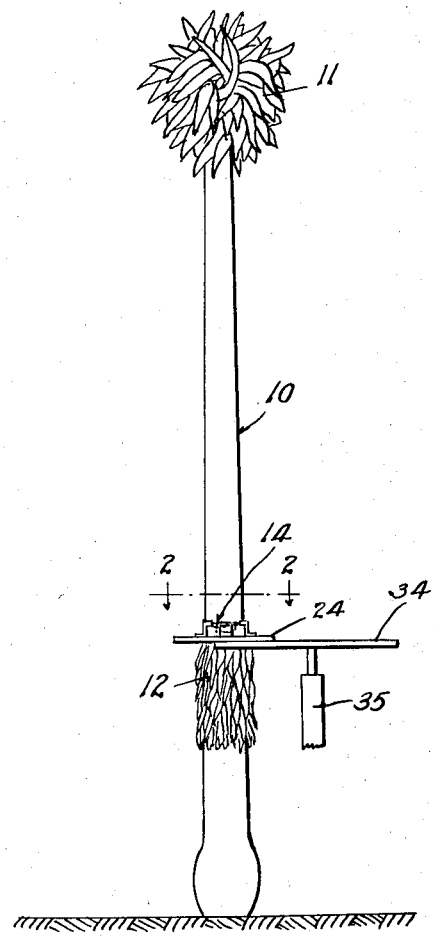
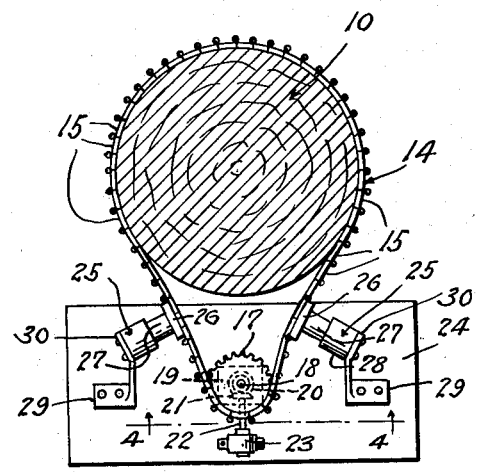
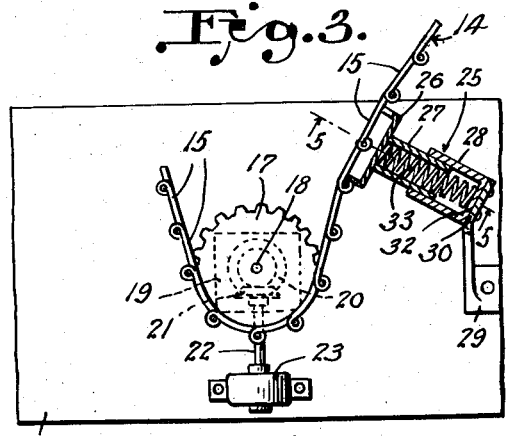
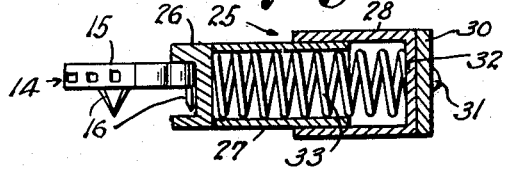
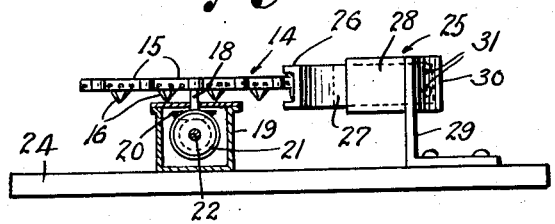
Charles G. Bathé
INVENTOR
ATTORNEYS.

United States Patent Office 2,871,620
Patented Feb. 3, 1959

2,871,620
PALM TREE TRIMMER

Charles G. Bathé, Long Beach, Calif.

Application December 29, 1955, Serial No. 556,215

2 Claims. (Cl. 47—1)

This invention relates to a means for trimming the dead leaves or fronds from a palm tree.

An object of this invention is to provide a trimming means for a palm tree which includes a chain type saw engageable about the trunk of a tree so that vertical movement in a downward direction of the saw will cut the dead or dried fronds or leaves which normally hang from the tree trunk.

A further object of this invention is to provide a chain type saw or cutter which is adapted to be mounted on a vertically adjustable platform of conventional construction so that when the platform is lowered the saw or cutter will cut the dried fronds or leaves which normally hang about the trunk of a tree.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a detail side elevation of a palm tree.

Fig. 2 is a sectional view taken substantially on the line 2—2 of Fig. 1.

Fig. 3 is a fragmentary sectional view similar to Fig. 2 on an enlarged scale.

Fig. 4 is a fragmentary sectional view taken on line 4—4 of Fig. 2.

Fig. 5 is a fragmentary sectional view taken on line 5—5 of Fig. 3.

Referring to the drawing, the numeral 10 designates the trunk of a palm tree. The trunk 10 has leaves or fronds 11 at the upper end thereof and the trunk 10 also has dried fronds or leaves 12 at a point below the leaves 11.

In order to provide a means whereby the dried leaves or fronds 12 may be easily and quickly removed from the trunk 10, I have provided a chain saw or cutter member generally indicated at 14. The cutter member 14 is formed of a plurality of pivotally connected links 15 and the links 15 have disposed on the inner lower side thereof depending V-shaped cutter blades 16. The chain cutter or saw 14 is trained about a sprocket 17 which is secured to a driven shaft 18. The shaft 18 extends upwardly from a gear housing 19 and the lower or inner end of the shaft 18 has fixed thereto a bevel gear 20. The gear 20 meshes with a driving gear 21 secured to a drive shaft 22 operated by means of a motor or power member 23. The housing 19 and the power member 23 are mounted on a horizontally disposed platform 24. The links 15 of the chain saw or cutter 14 are of the separable type so that the chain may be broken at any point in order to provide for encircling the trunk 10 with the saw or cutter 14. The cutter 14 is held in contacting relation about the trunk 10 by means of a pair of spring-pressed guides or pressure members 25. The guides or pressure members 25 are formed of a U-shaped forward end or guide shoe 26 through which the chain links 15 and the cutter blades 16 loosely engage. The U-shaped member or head 26 is secured to a tubular shank 27 which is slidable on a cylindrical guide 28. The guide 28 is secured to the upper end of an L-shaped bracket 29 which is formed with an obtusely angled upper end 30 secured by fastening means 31 to the outer end wall 32 of the guide 28. An extension spring 33 is disposed within the shank 27 and bears at its outer end against the end wall 32 so as to constantly maintain the chain tensioning head 26 in contact with the chain or saw member 14. As shown in Fig. 2, there are two of these chain tensioning members 25 which bear against opposite runs of the chain 14.

In the use and operation of this trimmer, the platform 24 is mounted on the upper side of a vertically adjustable platform 34. The platform 34 is a conventionally mounted platform of a type which is carried by a vehicle and similar to the street lamp shade cleaning platform. The platform 34 is elevated by means of an elongated handle 35 to a point above the uppermost ones of the dry leaves or fronds 12. The chain member 14 is then separated and extended about the trunk 10 of the palm tree. The ends of the chain are then connected together and the power member 23 will then move the chain cutter or saw 14 about the trunk 10 of the tree. As the blades 16 cut the leaves or fronds at the trunk ends thereof the leaves or fronds will drop downwardly and the platform 34 with the base or platform 24 may then be lowered so that the entire amount or number of dried leaves 12 will be cut from the trunk of the tree.

With a construction as hereinbefore described it is a relatively simple matter to clean the trunk of a palm tree of dried leaves.

What is claimed is:

1. A device for trimming palm trees comprising a horizontal supporting platform, power means including a drive sprocket carried by said supporting platform, a carrier chain adapted to completely encircle the trunk of a palm tree engaged with said sprocket for operation in a horizontal path of travel about said trunk, cutting blades carried by said chain disposed in depending perpendicular relation to the path of travel of said chain for trimming the trunk of the palm from the top downwardly, and elongated handle means secured to the underside of said supporting platform for controlling the elevation of said support and hence said chain.

2. A device for trimming palm trees comprising a horizontal supporting platform, power means including a drive sprocket carried by said supporting platform, a carrier chain adapted to completely encircle the trunk of a palm tree engaged with said sprocket for operation in a horizontal path of travel about said trunk, cutting blades carried by said chain disposed in depending perpendicular relation to the path of travel of said chain for trimming the trunk of the palm from the top downwardly, cylinders mounted on said supporting platform adjacent said sprocket on opposite outer sides of said chain, tubular shanks in said cylinder, springs biasing said shanks toward said chain, and U-shaped guide shoes carried by the ends of said shanks loosely engaging the outer side of said chain.

References Cited in the file of this patent

UNITED STATES PATENTS

| 1,937,073 | Stuve | Nov. 28, 1933 |
| 2,190,359 | Hipple | Feb. 13, 1940 |
| 2,321,962 | Zandecki | June 15, 1943 |
| 2,482,392 | Whitaker | Sept. 20, 1949 |
| 2,534,595 | Hamilton | Dec. 19, 1950 |
| 2,612,724 | Llewellyn | Oct. 7, 1952 |

FOREIGN PATENTS

| 584,018 | Germany | Sept. 13, 1933 |
| 595,333 | Germany | Apr. 9, 1934 |
| 161,366 | Switzerland | July 1, 1933 |